(No Model.) 2 Sheets—Sheet 2.
J. J. LACEY.
COUPLING FOR CONNECTING PIPES.
No. 324,031. Patented Aug. 11, 1885.
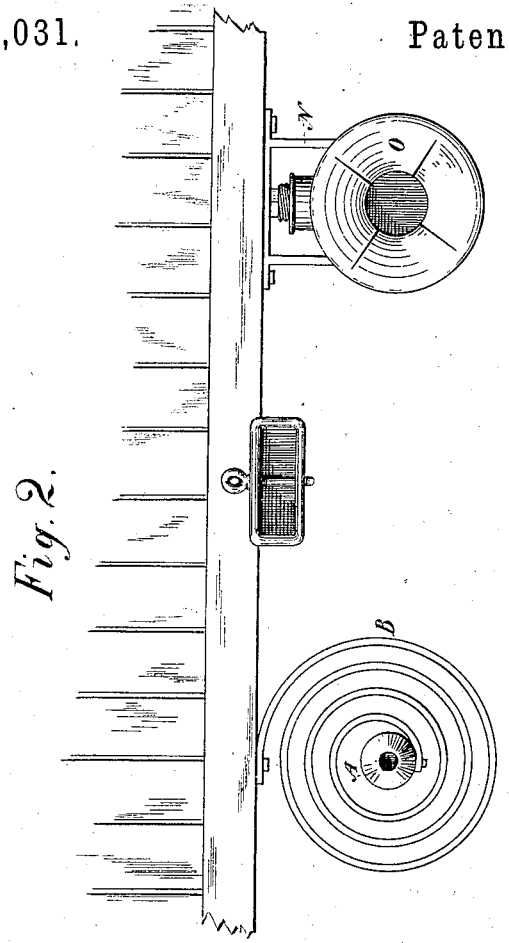
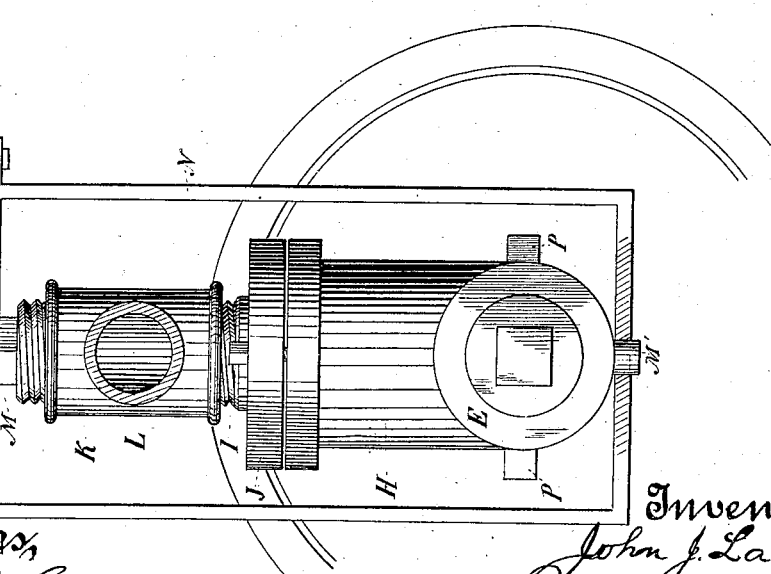
Witnesses,
Geo. H. Strong
J. H. Rouse
Inventor,
John J. Lacey
By Dewey & Co.
Attorneys

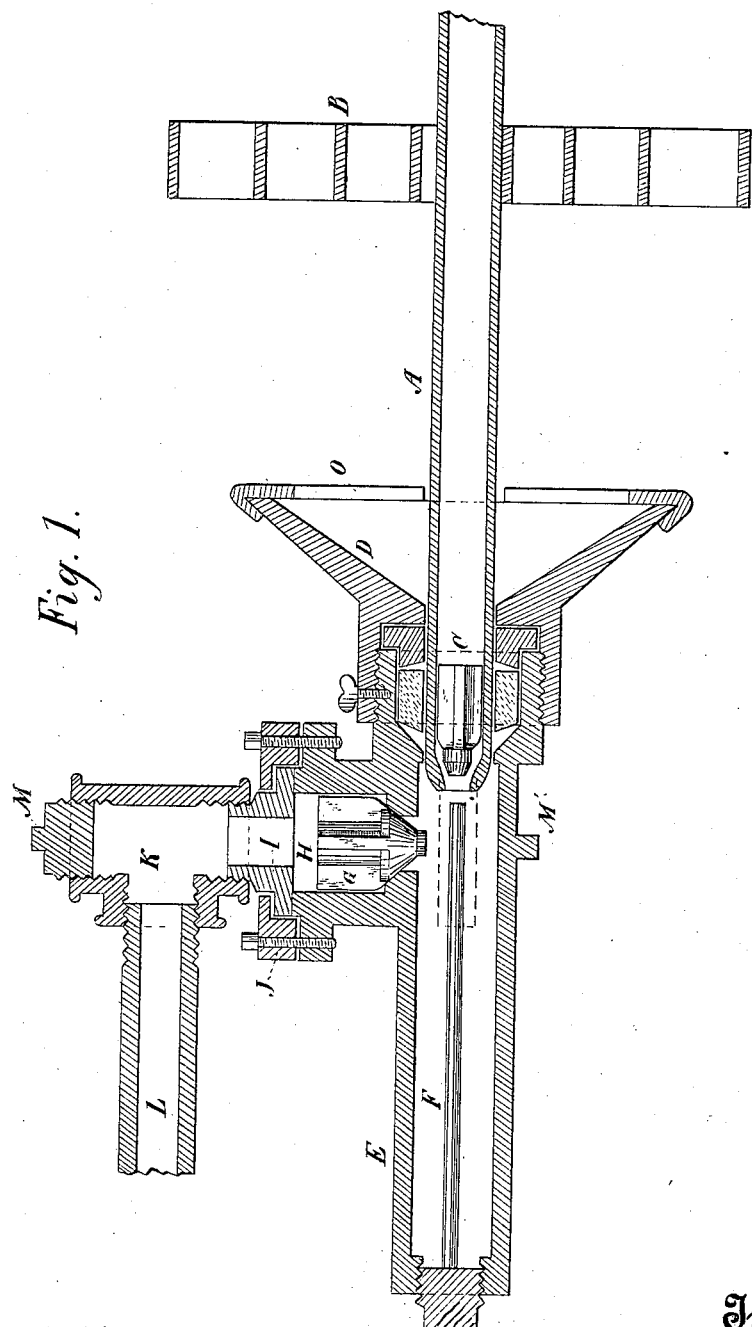

United States Patent Office.

JOHN J. LACEY, OF SAN FRANCISCO, ASSIGNOR TO LACEY AUTOMATIC COUPLING COMPANY, OF OAKLAND, CALIFORNIA.

COUPLING FOR CONNECTING PIPES.

SPECIFICATION forming part of Letters Patent No. 324,031, dated August 11, 1885.

Application filed May 12, 1884. (No model.) Patented in Germany March 18, 1884, No. 28,717, and in England March 19, 1884, No. 5,125.

*To all whom it may concern:*

Be it known that I, JOHN J. LACEY, of the city and county of San Francisco, and State of California, have invented an Improvement in Couplings for Connecting Pipes; and I hereby declare the following to be a full, clear, and exact description thereof.

My invention relates to a joint or coupling for pipes which are supported upon structures one or both of which may be subjected to irregular transverse or other movements; and it is especially applicable to the coupling of pipes which extend beneath railway-carriages for the purpose of conveying air, steam, water, or other medium through a train.

It consists of adjustably-supported pipe ends at the adjacent or meeting ends of two cars, so constructed that one may slip into the other as the cars approach, a means for the automatic opening of a passage from one pipe into any other when they meet, a means for rendering the joint steam, water, or air tight, while allowing the pipes side or end play to accommodate them to the motions of the cars, a protecting cap or cover for the open or bell mouthed coupling end, and an arrangement by which the coupling device may always be used, whichever ends of the cars may come together.

Referring to the accompanying drawings for a more complete explanation of my invention, Figure 1 is a longitudinal vertical section of my coupling. Fig. 2 is an end view showing both male and female couplings attached to the same end of the car. Fig. 3 is a rear view of the female portion of the coupling, showing the swivel-connection and pivots and the stops for side movement.

In the present case I have shown my pipe-couplings as adapted to be attached to the meeting ends of two cars, which have the usual coupling or connecting device, and they are adapted to the cars so that pipes may be coupled without reference to the position of the cars—that is, whichever ends of the cars are presented to each other. In order to do this two sets of pipes pass beneath the car upon opposite sides of and equally distant from the center line of the car. The female portion of my coupling may be attached to the pipe end at one side of the central line and the male portion at the other, as shown in Fig. 2.

The male portion A of my coupling is a pipe or nozzle supported in a coiled spring, B, which allows it considerable movement in every direction. The end of this pipe is rounded, and has within it a seat, against which a valve, C, fits and keeps it closed against any pressure which may come within the pipe.

The female portion of the coupling consists of the flaring mouth D, screwed or otherwise fitted upon a cylindrical extension, E, which has a screw-plug in the rear end and a rod, F, extending forward within the pipe E, so that when the pipe A enters this portion of the coupling the rod F will force the valve C back so as to open a passage. At the same time the pipe A passes beneath the point of the valve G, which moves in the vertical chamber H, connecting with the upper part of the pipe E, and lifts this valve sufficiently to open communication, through the chamber H, with the pipe E, and thence with the pipe A.

The gland I fits upon the top of the chamber H, and is secured by an annular flange, J, which is bolted to the flange of the chamber H, so as to allow the gland I to turn within it and make a perfectly tight joint.

K is a coupling screwed upon the top of the gland I, and it has a pivot-joint, M, formed upon its upper end or upon a screw-cap, which fits into its upper end.

A corresponding pivot-joint, M', is formed on the bottom or lower side of the pipe E in a direct line beneath the joint M, and these joints fit into sockets in a frame or strap, N, which is secured to the car-body. The main pipe L, through which steam, air, water, or other fluid is intended to pass, screws into the side of the coupling K, and may be secured to the car-body.

It will be seen from this construction that in turning, the motion of the car, such as will be produced in moving around a curve, or any side movement communicated to this portion of the coupling from the part A, would cause it to turn upon its pivot M' and the joint formed between the gland I and flange J without in any way disturbing or affecting the main pipe L.

P P are two lugs or stops projecting from the sides of the part E, between the side straps, N, and they act as stops to prevent this part from being turned around too far upon its pivots, either by accident or design, when the cars are not coupled. These lugs have sufficient play between the sides N to allow the coupling to turn as far as will be required by any curve which may occur on the line of the road.

If the coupling is to be used for one purpose only, as to convey air for the use of air-brakes or for vacuum-brakes, or to convey steam or water for heating or other purposes, it will only be necessary to have one connection with the locomotive, which would leave the unused funnel-mouth liable to become clogged with dust or dirt. In order to protect this from the entrance of dust or dirt which might enter and clog the pipes, I employ a cap or covering, O, formed of rubber, leather, or other elastic material. This cap is perfectly tight, and may be attached to the engine or car by a chain, (not shown,) so as to be pulled off the funnel D when the engine leaves the car. Similar caps are used to cover the funnels D between the cars, and they may be slit or otherwise formed, so as to nearly or quite close the mouth, but will yield to allow entrance of the pipe A when connection is to be made.

It will be seen that, if desired, both sets of pipes may communicate with air or vacuum brake-cylinders when used for this purpose alone, and will thus insure connection if one side should become disconnected or disabled; or one set may be used for this purpose and the other to convey steam, air, or water for heating or for any other purpose. In the latter case there would be two connections with the locomotive.

Having thus described my invention, what I claim as new, and desire to secure by Letters Patent, is—

1. In a pipe-coupling which is fixed to railway-carriages, a funnel-shaped mouth with the extension E directly in the rear, into which the pipe A from the opposite car may be received, valves C and G in the chamber H and pipe A, which are opened when a connection is made, as shown, in combination with a swivel-joint, I J, connecting with the main pipe L, pivot-pins M and M', about which this portion of the coupling may turn without disturbing pipe L, and a strap, N, substantially as herein described.

2. The funnel-shaped mouth D in a pipe-coupling, with its elastic cap or covering O, substantially as herein described.

3. In a pipe-coupling for railway-carriages, the funnel-shaped receiving-mouth, the extension-pipe in the rear, provided with a pivot-pin, M', chamber H, provided with stops P, gland I, coupling K, provided with pin M, and a strap or support, N, substantially as herein described.

In witness whereof I have hereunto set my hand.

JOHN J. LACEY.

Witnesses:
S. H. NOURSE,
J. F. KINGWELL.